(12) United States Patent
Hattar et al.

(10) Patent No.: US 10,652,181 B2
(45) Date of Patent: May 12, 2020

(54) ROAMING BETWEEN VARIOUS LINK SERVICE AND MESSENGERS AND ALTERNATIVE ROAMING FOR TELEPHONE CONNECTION

(71) Applicant: Hattar Tanin, LLC, Novato, CA (US)

(72) Inventors: Saadeh Hattar, Novato, CA (US); Volodymyr Tanin, Kiev (UA)

(73) Assignee: Hattar Tanin, LLC, Novato, CA (US)

(*) Notice: Subject to any disclaimer, the term of this patent is extended or adjusted under 35 U.S.C. 154(b) by 0 days.

(21) Appl. No.: 16/120,445

(22) Filed: Sep. 3, 2018

(65) Prior Publication Data

US 2019/0068531 A1    Feb. 28, 2019

Related U.S. Application Data

(63) Continuation of application No. 15/361,323, filed on Nov. 25, 2016, now Pat. No. 10,069,774.

(60) Provisional application No. 62/259,113, filed on Nov. 24, 2015.

(51) Int. Cl.
| | |
|---|---|
| *H04L 12/58* | (2006.01) |
| *H04W 8/20* | (2009.01) |
| *H04L 29/06* | (2006.01) |
| *H04L 12/18* | (2006.01) |

(52) U.S. Cl.
CPC ........ *H04L 51/066* (2013.01); *H04L 12/1818* (2013.01); *H04L 51/046* (2013.01); *H04L 65/1069* (2013.01); *H04L 65/4015* (2013.01); *H04L 69/18* (2013.01); *H04W 8/20* (2013.01)

(58) Field of Classification Search
CPC . H04L 12/1818; H04L 51/046; H04L 51/066; H04L 65/1069; H04L 65/4015; H04L 69/18; H04W 8/20
USPC .................................................... 455/432.2
See application file for complete search history.

(56) References Cited

U.S. PATENT DOCUMENTS

| | | | |
|---|---|---|---|
| 2008/0056239 A1* | 3/2008 | Loingtier | H04L 29/06027 370/352 |
| 2013/0066974 A1* | 3/2013 | Yoakum | H04L 65/1069 709/205 |
| 2014/0267577 A1* | 9/2014 | Weber | H04L 12/1822 348/14.09 |

(Continued)

Primary Examiner — Timothy X Pham
(74) Attorney, Agent, or Firm — KW Law, LLP

(57) ABSTRACT

Systems and methods are provided for facilitating communication between two or more incompatible communication application. A first request is transmitted from a first communication application to open a communication channel with a conference server. The conference server includes a program for facilitating communication between incompatible communication applications. After receiving the first request transmitted by the first electronic device, the server establishing a communication channel with the first electronic device operating a first communication application and establishes a second communication channel with a second electronic device operating a second communication application. The conference server then facilitates communication between the first communication channel and the second communication channel, e.g., by converting communication signals sent through the first communication application into communication signals compatible with the second communication application and vice versa.

6 Claims, 7 Drawing Sheets

(56) References Cited

U.S. PATENT DOCUMENTS

2016/0165184 A1\* 6/2016 Aaron ...................... H04N 7/15
                                                      348/14.08
2016/0323330 A1\* 11/2016 Holst ...................... H04L 12/18

\* cited by examiner

ROAMING BETWEEN VARIOUS LINK SERVICE AND MESSENGERS AND ALTERNATIVE ROAMING FOR TELEPHONE CONNECTION

CROSS REFERENCE TO RELATED APPLICATION

This application is a continuation of U.S. application Ser. No. 15/361,323, filed on Nov. 25, 2016, entitled ROAMING BETWEEN VARIOUS LINK SERVICES AND MESSENGERS AND ALTERNATIVE ROAMING FOR TELEPHONE CONNECTION and issued as U.S. Pat. No. 10,069,774, which claims priority to and the benefit of U.S. Provisional Patent Application No. 62/259,113, entitled "Roaming Between Various Link Services and Messengers and Alternative Roaming for Telephone Connection," filed Nov. 24, 2015, both of which are hereby incorporated by reference in their entirety for any purpose.

TECHNICAL FIELD

This specification describes methods and systems for connecting different communications applications.

BACKGROUND

Linking services like Skype, Viber, and WhatsApp are becoming increasingly popular and the total number of communication applications is growing. Unfortunately these communications applications lack interoperability. In order for a person to communicate with all of their contacts, they need to have multiple communications applications, each with their own list of contacts. It is time consuming for a user to have to search through multiple lists of contacts in multiple applications to find a particular contact. Further, having multiple communication applications on an electronic device consumes additional memory on the device.

Additionally, in many cases roaming cell service charges abroad are expensive, and there are many places where there is no Internet connection allowing for inexpensive communication through a communications application.

SUMMARY

The present disclosure solves these and other problems by providing systems and methods for linking local telephone calls and various application-based communications platforms.

In some embodiments, the systems and methods allow some or all of the features available in existing application-based communication platforms (e.g., Skype, Viber, WhatsApp, etc.), for example:
audio and/or video communication;
audio and/or video-conferencing;
communication directly to a phone (e.g., through a phone number)
text messaging; and
file transfer.

However, the methods and systems described herein provide features not available in conventional application-based communication platforms. For example, in some embodiments, the methods and systems described herein connect one or more phone lines (e.g., or phone calls between two or more phone users) to users of one or more linking service (e.g., Skype, Viber, WhatsApp, and/or the application described herein). Similarly, the methods and systems described herein allow communication between different application-based communication platforms (e.g., it allows a first person using skype to speak with a second person using Viber, WhatsApp, etc.).

In this fashion, according to some implementations, the methods and systems described herein are capable of creating a tele/video-conference between persons using multiple application-based communication platforms and/or telephone lines (e.g., cellular or wired hard lines). For example, the systems and methods allow a cellular phone user to call a user of an application-based communications platform from their cellular connection and vice versa (e.g., a user of an application-based communications platform can call a telephone line through their internet connection.

In some embodiments, the systems and methods described herein enable conference calls between participants using different application-based communications platforms. The link service allows the user to organize conferences, where participants may use Skype, Viber or any other link service as well as their phones to connect or to be connected to the conference. Participants may make or receive call(s) in any system like Skype, Viber, etc. to be connected to the conference. They may also make phone call(s) (from their mobile or stationary phones) to the conference organizer (the user of the proposed link service) or receive call(s) from the conference organizer (the user of the proposed link service) to be added to the conference.

In some embodiments, where the conference organizer and/or user of the program/service has several phone numbers (may have several SIM cards in the same cell phone (phone like device) or have several stationary or mobile phones connected to the program/service), call(s) to or from him may be made to or from any of these numbers and any or all these calls may be added to the above mentioned conference. The conferences of such kind may be conducted using the capacity of a mobile phone/computer or other local device or they may be organized via server, where all participants, except those using phone lines, are clients. The server receives data (audio and/or video) from different devices, decodes them, encodes into different formats and sends to respective clients. If there are many different conference participants using different link services, it is better to use server. Conference participants, who are using phone lines, are connected to the server via devices connected to the service described herein.

In some embodiments, the methods and systems described herein allow the organization of complex conference(s), where several separate conferences held on different application-based communication platforms (e.g., Skype, Viber, phone, etc.) are united into one conference.

In some embodiments, the systems and methods described herein provide interoperability between different application-based communication platforms (e.g., Skype, Viber, WhatsApp, etc.). In some embodiments, the systems and methods described herein create a combined list of contacts from various application-based communication platforms (e.g., Skype, Viber, WhatsApp, etc.). In some embodiments, the systems and methods provided herein allow a user to call any contact, regardless of the communication platform used by the contact, through any of the user's application-based communication platforms. For example, using the systems and methods provided herein, a user can call, using their Skype account, a contact using a Viber account.

In some embodiments, the systems and methods described herein connect users attempting to communicate with each other through an unavailable communication platform by automatically rerouting the communication through an alternative, available communication platform. For example, if a first user tries to communicate with a second user through Skype, when a Skype connection is unavailable, the system and methods described herein will reroute the connection through a second communications platform (e.g., Viber) than is available to one or more of the users. In some embodiments, the communication is rerouted through a same service available to all (e.g., both) users (e.g., the communication is routed through Viber for both users). In some embodiments, the communication is rerouted through a different service to all (e.g., both) users (e.g., if Viber is available for one user and FaceTime is available to the other user, the systems and methods described herein facilitate communication between the two applications).

The users can be also connected by our service using account names/addresses of a non-working link service, of any other link service(s), and/or of our link service. It means that the users registered in the system and having different accounts in different link services, which are also registered in the system, have the possibility to be connected even in the case if some of the link services do not function. For example, if Skype does not work at the current moment and both users have registered accounts in Skype, which are registered/authorized in our service/program, they can call to one another using our service that will provide the link between above mentioned Skype contacts/logins.

The program/service provides possibility, having just one account in any one link service and having registered or logged in with this one account in our program/service (and/or account in our link service) to call to any contact(s) in any link service(s) and to make a conference with one or more contacts from one or more link services.

The user of the program/service is able to regulate the quality of audio/video signal depending on the quality of signal transmission in the Internet and/or telephone network. The quality of audio/video signal depending on the quality of signal transmission in the Internet and/or telephone network may be also adjusted by the program/service automatically.

In some aspects, the systems and methods provided herein provide an alternative communications channel to conventional cellular roaming. In some embodiments, this is achieved by connecting/rerouting an incoming or outgoing telephone call, text message (e.g., via a short messaging system ("SMS") or multimedia messaging service ("MMS")), video call, etc. through the communications platform described herein, e.g., when an internet connection is available. In this fashion, a user is able to make and/or to receive phone calls, send and/or receive SMS, MMS, when travelling abroad, but without paying international roaming charges. Rather, a local connection fee or free internet connection can be used.

Access to alternative roaming (right to use phone(s)/phone number(s), connected to the systems described herein) may be granted to the other users of the communication system. This allows users (e.g., relatives) to communicate from a foreign country without paying international communication fees (e.g., requiring local tariffs at most). The described systems and methods may also be used to lower expenses for businesses participating in international business.

In some embodiments, where multiple phone numbers (e.g., in different network systems) are connected to the communication platform described herein, the platform selects an appropriate phone number to use when placing an outgoing call. For example, the system selects a registered phone number that creates an in-network call to the outgoing number. In some embodiments, an account holder that grants access of their number to other users, may forbid to specified numbers and/or networks.

In some embodiments, the systems and methods described herein facilitate connection to an Internet application-based communications platform through an intermediate telephone. For example, in some embodiments, when a user attempting to communicate through an internet-based communications platform (e.g., Skype, WhatsApp, Vibe, etc.) has a poor internet connection, a call is placed to an intermediate phone (e.g., phone number) located in a location with a strong internet connection. The intermediate phone then routes the call through the desired Internet application-based communications platform. In some embodiments, digital contact information (e.g., contact information for the user being connected to with the internet application-based communications platform) may be passed from the primary phone to the intermediate phone by an audio signal.

In some embodiments, the systems and methods described herein combine the use of alternative roaming connectivity with the interoperability of multiple application-based communication platforms. For example, a user can place a call routed through an intermediate phone may be combined with alternative roaming. In this case the user being abroad with poor internet connection is able to make calls to his home country by local tariffs, using his telephone(s) with home-country telephone number, which is connected to our program/service and physically located in the home country. The intermediate phone has to be in the place with good Internet connection in the same country where the user is. Operator(s) of telephone communication services, including, but not limited to, cell-phone-communication providers, can be engaged into the system to provide intermediate phone (intermediate phone number) for above purpose.

In some implementations of the systems and methods described herein, communication (e.g., calls, messages, etc.) can be redirected from any account of the user in one or more application-based communication platform to any one or more different application-based communication platform (e.g., though an associated account in the different application-based communication platform).

In some embodiments, a user organizing a conference between users of different communication platforms can hide one or more conference participants, participant contact information, messages, file transfers, video feeds, and/or audio feeds from any or all other conference participants.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
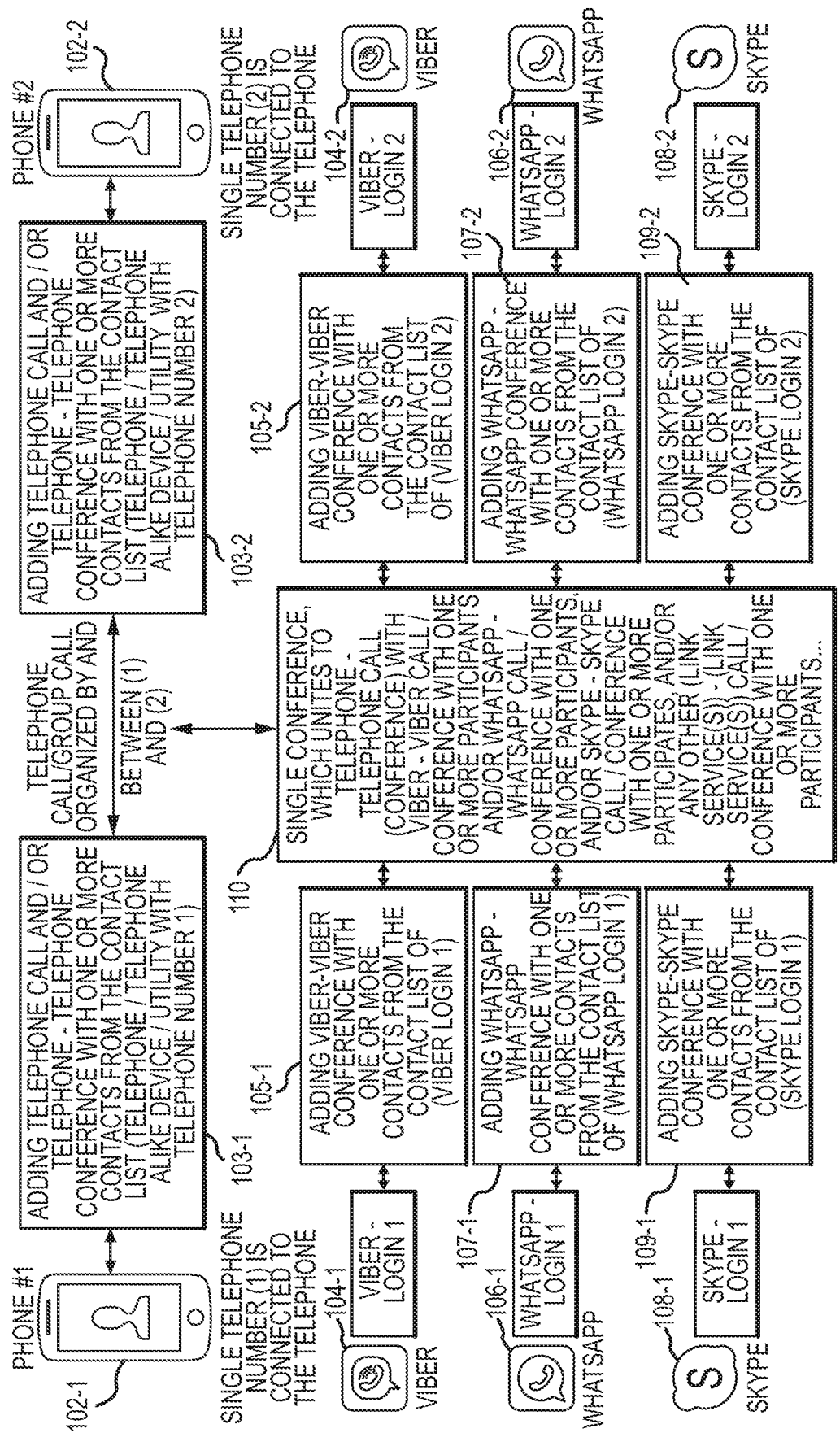
FIG. 1 illustrates an exemplary method for facilitating a conference between participants using different communication platforms (e.g., connected by different application-based communication platforms and/or telephone lines), in accordance with some implementations of the present disclosure.

Reference will now be made in detail to implementations of the present application as illustrated in the accompanying drawings. The same reference indicators will be used throughout the drawings and the following detailed description to refer to the same or like parts. Those of ordinary skill in the art will realize that the following detailed description of the present application is illustrative only and is not intended to be in any way limiting. Other embodiments of the present application will readily suggest themselves to such skilled persons having benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Embodiments of electronic devices and associated processes for using such devices are described herein. In some embodiments, the device is a portable communications device, such as a mobile telephone, that also contains other functions, such as PDA and/or music player functions. Other portable electronic devices, such as laptops or tablet computers are, optionally, used. In some embodiments, the device is not a portable communications device, but is a desktop computer.

The electronic devices described herein include a communication module facilitating communication with other devices, e.g., wired over one or more external ports and/or wirelessly through a wireless network. Examples of networks include, but are not limited to, the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol fore mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of the present disclosure.

Unless otherwise specified, the communication channels described herein are internet-based protocols, e.g., packet-based and/or internet protocol-based communication, rather than a telephone communication. In some embodiments, the methods, programs, and devices further facilitate communication between one or more internet protocol communication channels and one or more telephone signals (e.g., as part of a large conference between users operating different types of communication applications (e.g., communication applications having a different identity).

In some embodiments, the methods and systems provided herein join two or more users of different communication applications together in a single linking conference 110. Referring to FIG. 1, in some embodiments, one or more electronic devices log-into a conference via a phone line 102 or communication application (e.g., Viber 104, WhatsApp 106, or Skype 108). In some embodiments, an entire teleconference 103, or conference between two or more users of a communication application (e.g., Viber 105, WhatsApp 107, or Skype 109) are joined to the linking conference 110. In some embodiments, the linking conference 110 is hosted by a conferencing server having software that facilitates communication between different communication applications, e.g., by converting a communications signal from a first communications platform (e.g., a phone line or communication application) into a communications signal compatible with a second communications platform. For example, in a conference between a first user operating Viber 104 and a second user operating WhatsApp 106, the communications server hosting teleconference 110 converts the Viber communication signal into a communications format compatible with WhatsApp, and vice versa.

Figure 2:
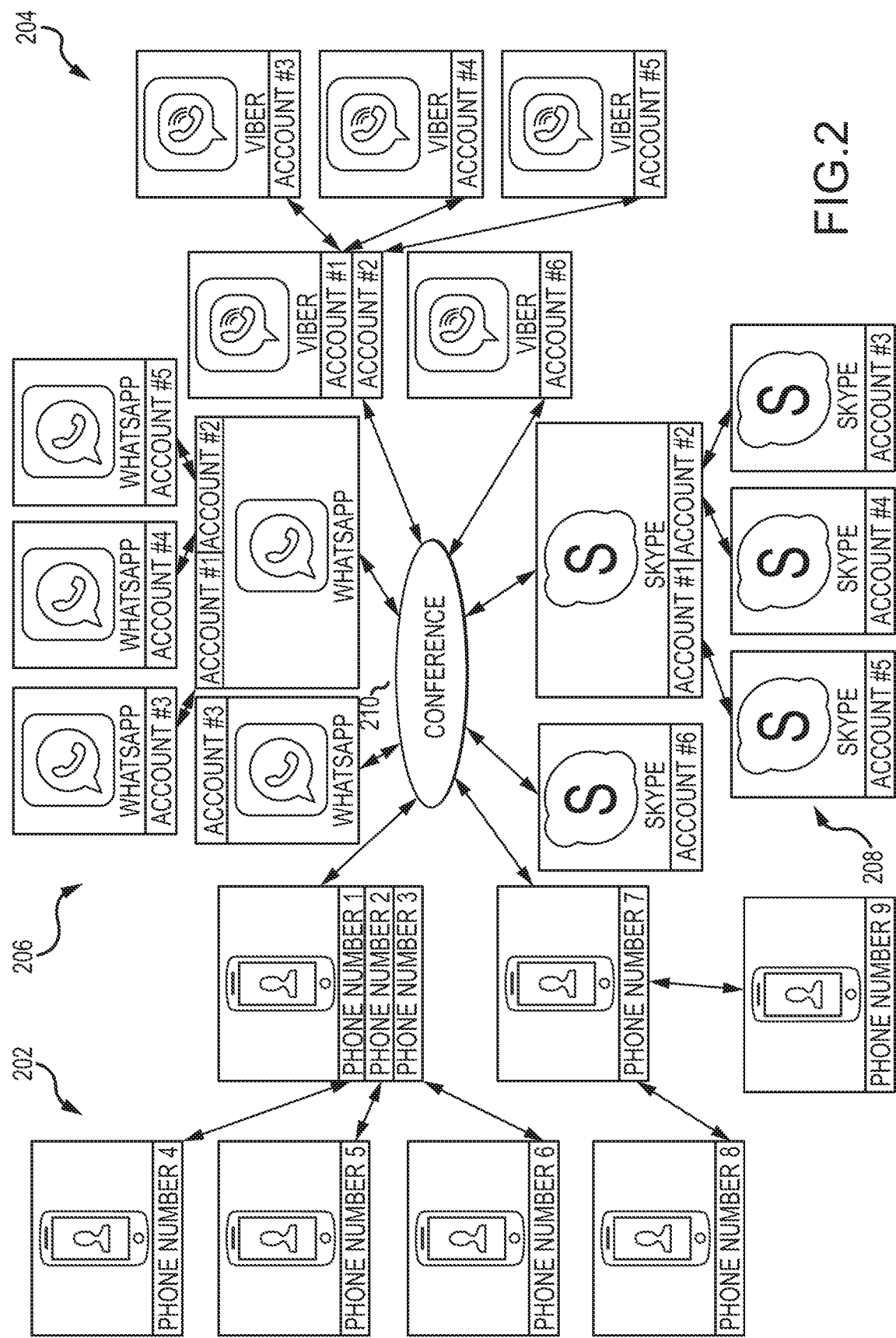
FIG. 2 illustrates an exemplary method for facilitating a conference between participants using different communication platforms (e.g., Skype, Viber, phone, etc.), in accordance with some implementations of the present disclosure.

Similarly, as illustrated in FIG. 2, multiple phone users 202 and communication application users (e.g., Viber users 204, WhatsApp 206 users, and Skype users 208) join a conference 210, either individually (e.g., such as the Viber, WhatsApp, and Skype accounts #6 in FIG. 2) or as an existing communication-specific conference (e.g., the phone conference between phone numbers 1, 2, and 3 join joint conference 210 as a group.

In some embodiments, the joint conferences (e.g., 110 and 210) are formed by each user or preexisting platform-specific conference dialing into a conference line (e.g., a predetermined conference line identified by a passcode or conference identity). In other embodiments, the joint conferences (e.g., 110 and 210) are formed by a first user (e.g., WhatsApp account user #6 in FIG. 2) providing the hosting server 210 a list of contacts, which the server then contacts (e.g., hosting server 210 contacts the other WhatsApp users 206, Viber users 204, Skype users 208, and phone users 202 after receiving a contact list from WhatsApp account user #6).

Figure 3:
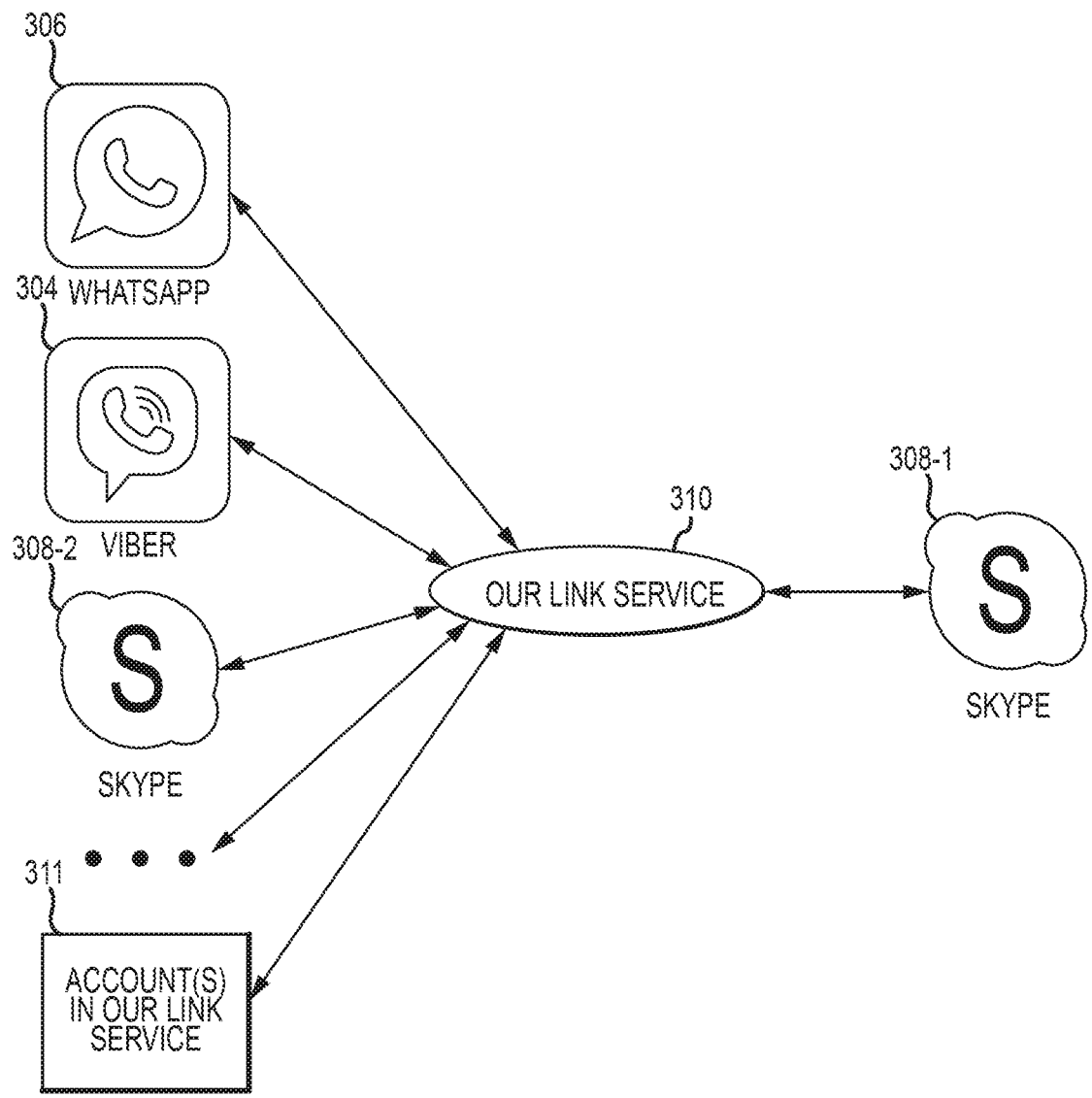
FIG. 3 illustrates exemplary routing of communications, using the systems described herein, between different communication platforms, in accordance with some implementations of the present disclosure.

In some embodiments, referring to FIG. 3, the methods and systems described facilitate a first user operating a first communications application (e.g., user 308-1 running Skype) calling a second user operating a second type of communication application (e.g., WhatsApp, Viber, Skype, or a communications application associated with the conference server 310. In some embodiments, the contacting user 308-1 sends a request to conference server 310 to open communications with a user associated with any of WhatsApp 306, Viber 304, Skype 308, or a communications application 311 associated with the conference server 310.

In some embodiments, the first user 308 provides a user identity and an identity of a communication application (e.g., an application and account identity) to connect with the second user. For example, the first user 308-1 sends a request to communication server 310 to connect with a second user operating Viber account 304.

In other embodiments, the first user 308 provides only a user identity to the conference server 310 (e.g., an identity associated with an account on the communications server). Conference server 310 then matches the second user identity to contact information previously registered with the conference server, and selects a communication platform (e.g., Viber account 304) to open communication with the first user.

Figure 4B:
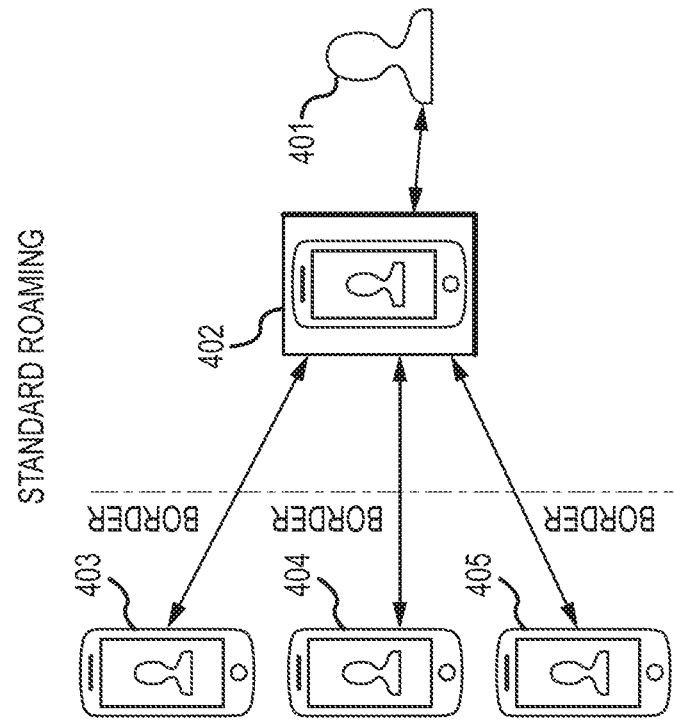
FIG. 4B illustrates a conventional method for communicating across borders.
Figure 4A:
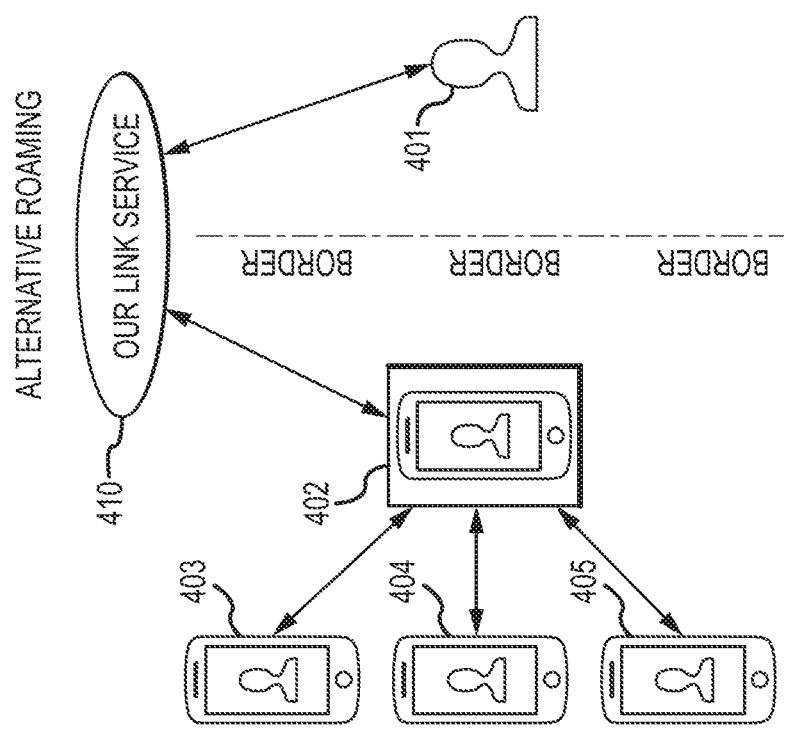
FIG. 4A illustrates an exemplary method (e.g., an "alternative roaming" method) for communicating across borders, in accordance with some implementations of the present disclosure

In some aspects, referring to FIG. 4A, the methods and systems described herein facilitate communication across borders without triggering conventional roaming communication (e.g., roaming voice or data charges), as illustrated in FIG. 4B. A first user 401, located in a first region (e.g., a foreign country) sends a request to conference server 410 (e.g., over an internet connection) to open a communication channel with one or more of users 403, 404, and 405, located in a second region. In some embodiments, conference server 410 opens a communication channel with a second electronic device 402, located in the same region as contacts 403, 404, and 405. Second electronic device 402 then contacts (e.g., calls) one or more of users 403, 404, and 405, incurring only local charges, and relays communications back to first user 401 by way of the conference server 410.

In some embodiments, conference server 410 includes a network of servers (e.g., PBX boxes) located in a plurality of regions. When first user 401 established communication with a first server in the network of servers 410, the server identifies the region the user is trying to contact (e.g., the location of users 403, 404, and 405, and routes the communication through a second server 402 in the network of servers 410, that is located in the same region as one or more of users 403, 404, and 405.

Figure 5:
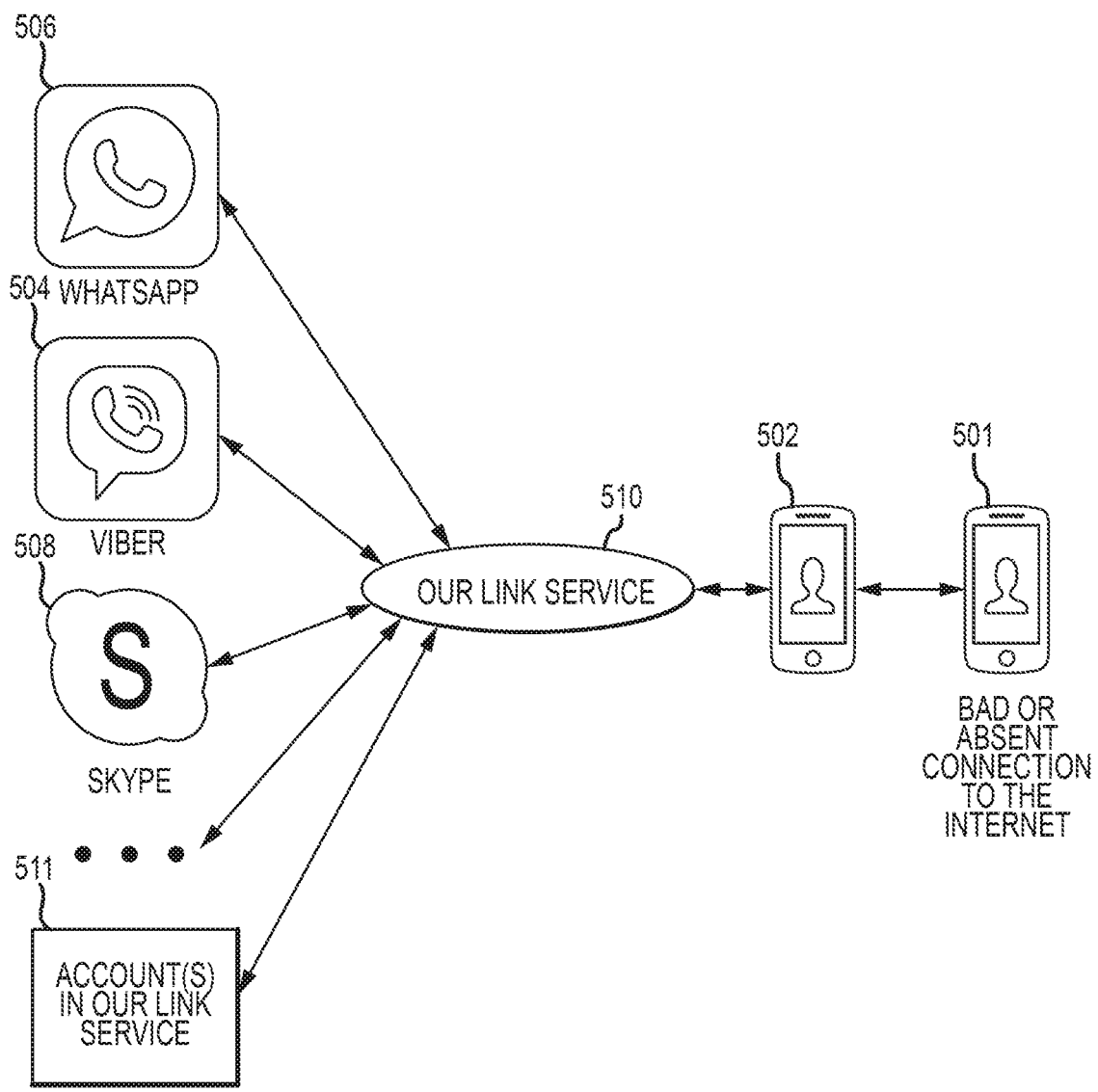
FIG. 5 illustrates an exemplary method for communicating through an intermediate phone connection (e.g., from a phone associated with a system described herein) and server to communicate with a contact on any communication platform, when a primary phone has poor or no connection to the Internet, in accordance with some implementations of the present disclosure.

In some aspects, referring to FIG. 5, the methods and systems described herein facilitate communication over the Internet (e.g., through a communications application) when a user does not have access to an Internet connection. For example, a first electronic device 501 (e.g., a smartphone), without a sufficient Internet connection, calls second electronic device 502 (e.g., a smartphone or it may be call intermediate phone number, which in given by cell-communication-provider, who is engaged into described system) and transmits information about a desired contact (e.g., an identity and/or account information for WhatsApp user 506). In some embodiments, the information is transmitted via sounds. Second electronic device 502, which has a sufficient Internet connection, sends a request (e.g., over the internet) to conference server 510, to open a communication channel with a user of a communication application (e.g., WhatsApp user 506). As described above, in some embodiments, conference server 510 is provided with contact information and, in some embodiments, conference server 510 looks-up pre-registered contact information. Conference server 510 then opens a communication channel with the desired user (e.g., WhatsApp user 506), which is relayed back to the first electronic device 501 through the phone connection with second electronic device 502.

Figure 6:
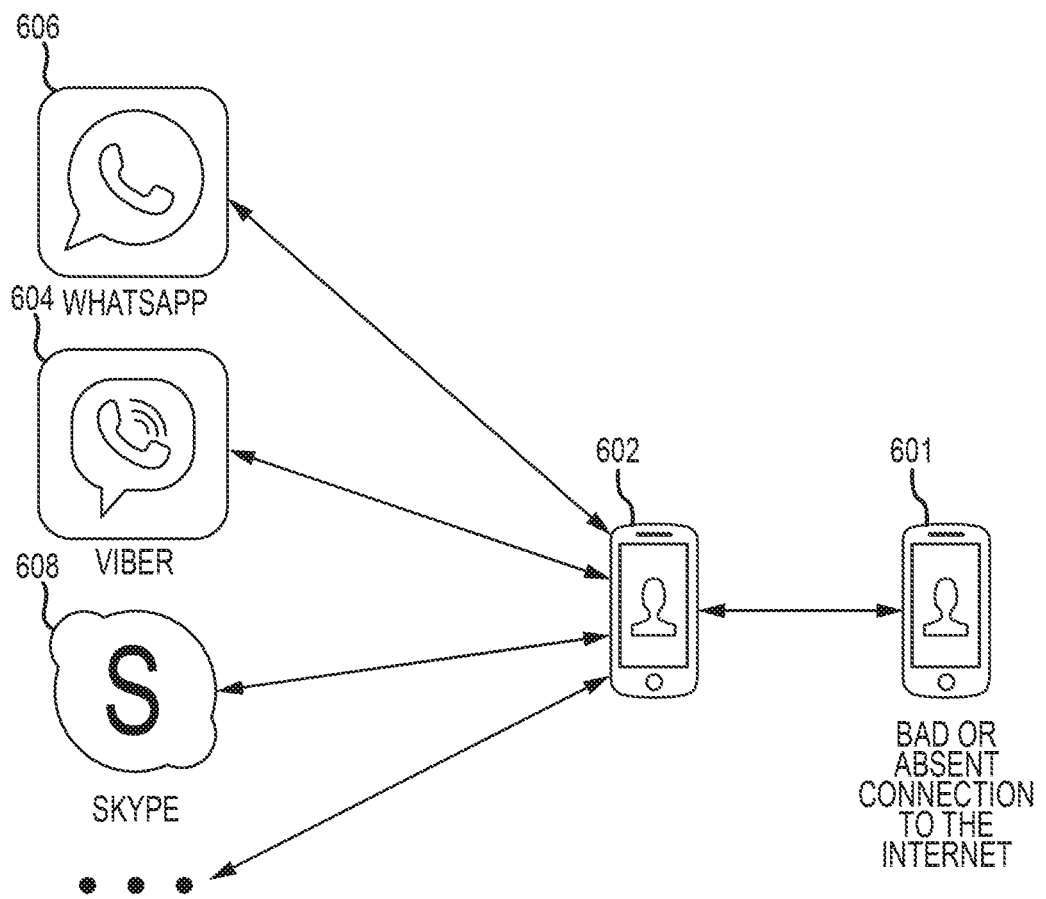
FIG. 6 illustrates an exemplary method for communicating through an intermediate phone connection (e.g., from a phone associated with a system described herein) to communicate with a contact on any communication platform, when a primary phone has poor or no connection to the Internet, in accordance with some implementations of the present disclosure.

Similarly, referring to FIG. 6, in some embodiments where the first electronic device 601 does not have a sufficient Internet connection, a phone call is placed to second electronic device 602 having a sufficient Internet connection. Second electronic device 602 then opens communication with a desired contact through a communication application (e.g., initiates a conversation in WhatsApp with WhatsApp user 606). The communication is then routed back to first electronic device 601 through the phone connection with second electronic device 602.

Figure 7:
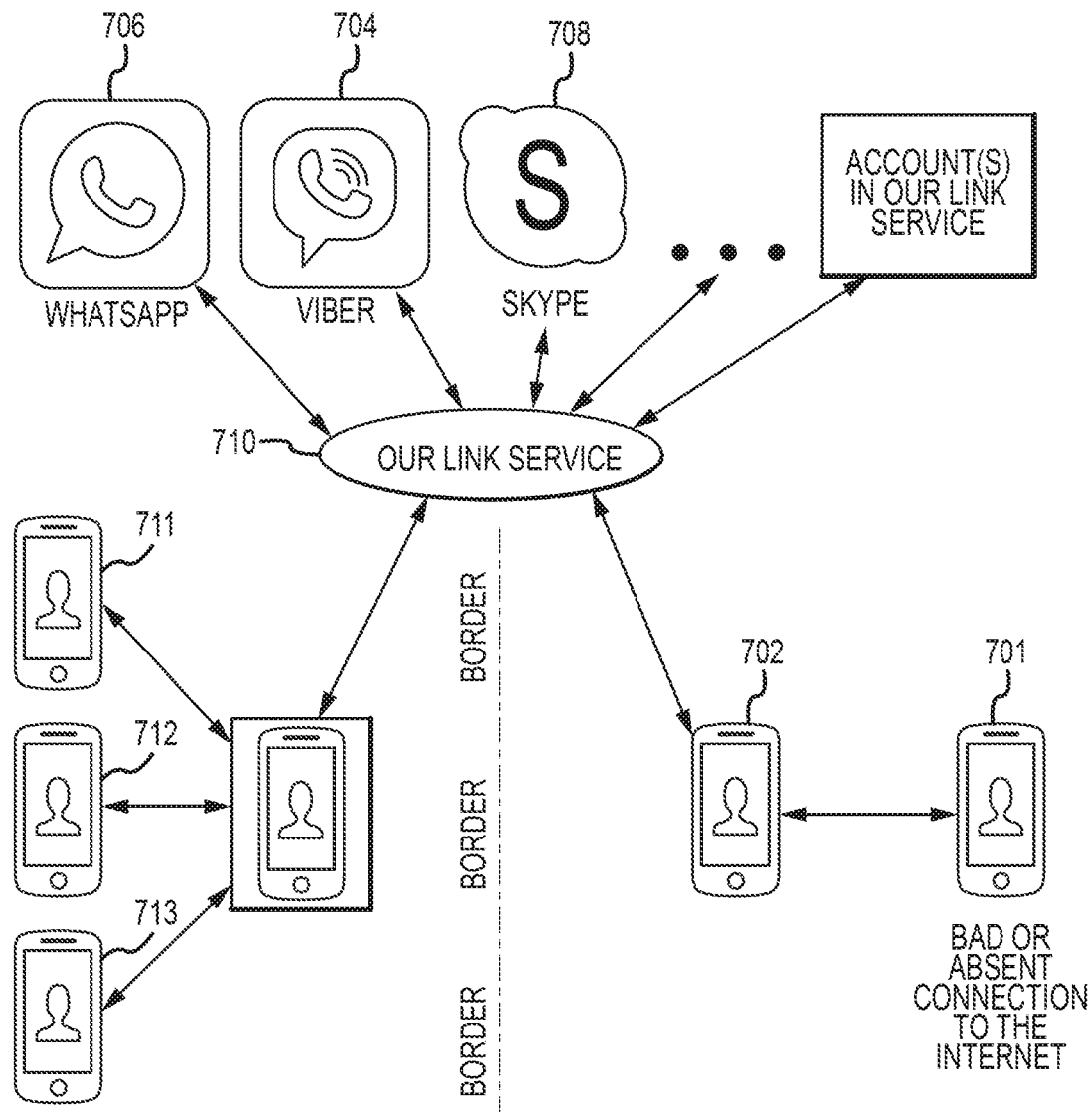
FIG. 7 illustrates an exemplary method for communicating across borders through an intermediate phone connection (e.g., from a phone associated with a system described herein) to communicate with a contact on any communication platform, when a primary phone has poor or no connection to the Internet, in accordance with some implementations of the present disclosure.

In some embodiments, referring to FIG. 7, more than one of the aspects described above is combined to (i) allow Internet communication when a sufficient Internet connection is not present (e.g., by first electronic device 701 placing a phone call to second electronic device 702); (ii) allow communication with multiple users of multiple communications applications (e.g., phone connection 702, Viber 704, WhatsApp 706, and/or Skype 708) in a joint conference at conference server 710, which facilitates communication between the different forms of communication; (iii) avoid roaming charges when contacting electronic devices in other regions (e.g., electronic devices 711, 712, and/or 713) by routing a connection through conference server 710 (e.g., which is optionally a network of servers located in different regions); and (iv)

In some embodiments, by/when making group (and/or not group) chat and/or group (and/or not group) audio-conference, and/or group (and/or not group) video-conference there is/are patent-pending possibility and/or patent-pending function, and/or patent-pending service, which allows/allow (and/or exists patent-pending possibility and/or patent-pending function, and/or patent-pending service) to unite in one/single group (and/or not group) chat and/or in one/single group (and/or not group) audio-conference, and/or in one/single group (and/or not group) video-conference simultaneously (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) all and/or chosen, and/or one, and/or specified contact(s) (and/or i.e. to link up and/or to connect to one/single group (and/or not group) chat and/or to one/single group (and/or not group) audio-conference, and/or to one/single group (and/or not group) video-conference all and/or chosen, and/or one, and/or specified contacts).

In some embodiments, the participants are from different contact lists, which are taken from different accounts, which are registered in frames of one/single link program and/or link service of voice communication and/or of visual communication, and/or of message exchange (messages of any type), In some embodiments, the participants are from different contact lists, which are taken from different accounts, which are registered in two, and/or in three, and/or in bigger/greater quantity of link programs and/or link services of voice communication and/or of visual communication, and/or of message exchange (messages of any type).

For example, there is/are patent-pending possibility and/or patent-pending function, and/or patent-pending program(s), and/or patent-pending service (and/or exists patent-pending possibility and/or patent-pending function, and/or patent-pending service), which allows/allow to the user/users of Skype link service (that, who have at least one/single account, which is registered in the link service Skype and/or that, who have some number of accounts, which are registered in the link service Skype), and/or to the user/users of Viber link service (that, who have at least one/single account, which is registered in the link service Viber and/or that, who have some number of accounts, which are registered in the link service Viber), and/or to the user/users of ICQ link service (that, who have at least one/single account, which is registered in the link service ICQ and/or that, who have some number of accounts, which are registered in the link service ICQ), and/or to the user/users of any other link service and/or of any other link services (that, who have at least one/single account, which is registered in any other link service and/or that, who have some number/range of accounts, which are registered in any and/or in specified, and/or in some number of any link services and/or of specified link services) to take part and/or to participate simultaneously (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) in one/single created (and/or made, and/or organized) group (and/or not group) chat and/or group (and/or not group) audio-conference, and/or group (and/or not group) video-conference.

In some embodiments, the methods, systems, and devices described herein are for simultaneous (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) participation in such and/or in similar group (and/or not group) chat and/or group (and/or not group) audio-conference, and/or group (and/or not group) video-conference each participant and/or party (except of organizer) of such and/or of similar group (and/or not group) chat and/or group (and/or not group) audio-conference, and/or group (and/or not group) video-conference (i.e. linked up and/or connected contact/contacts from abovementioned (mentioned in part #010) contact lists) needs to have at least one/single account, which is registered in one of abovementioned (mentioned in part #010, in this example) link services (link service/services, which is/are used by this exact participant/party)—it is that account/accounts, which is/are connected to such and/or to similar group (and/or not group) chat and/or group (and/or not group) audio-conference, and/or group (and/or not group) video-conference. And only to the organizer of such and/or of similar group (and/or not group) chat and/or group (and/or not group) audio-conference, and/or group (and/or not group) video-conference it is necessary to use patent-pending service with such patent-pending functions.

For example, a first user having registered account in patent-pending service and/or using patent-pending service, and/or patent-pending program(s), having connected to the present patent-pending service one account and/or more than one account, which are registered in link service Skype (in the present example there are two accounts, lets name them Skype1 and Skype2) and/or one account and/or more than one account, which are registered in link service Viber (in the present example there are two accounts, lets name them Viber1 and Viber2), and/or one account and/or more than one account, which are registered in link service ICQ (in the present example there are two accounts, lets name them ICQ1 and ICQ2), and/or one account and/or more than one account, which are registered in any other link service and/or in any other link services, is able to create/make/organize group (and/or not group) chat and/or group (and/or not group) audio-conference, and/or group (and/or not group) video-conference, in which it is possible to take part and/or to participate simultaneously (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) for one contact, or two contacts, or more than two contacts from the contact list of account Skype1, and/or for one contact, or two contacts, or more than two contacts from the contact list of account Skype2, and/or for one contact, or two contacts, or more than two contacts from the contact list of account Viber1, and/or for one contact, or two contacts, or more than two contacts from the contact list of account Viber2, and/or for one contact, or two contacts, or more than two contacts from the contact list of account ICQ1, and/or for one contact, or two contacts, or more than two contacts from the contact list of account ICQ2, and/or for one contact, or two contacts, or more than two contacts from the contact list and/or from contact lists of account and/or of accounts in any other link service and/or in any other link services, and etc.

In some embodiments, the methods, systems, and devices described herein are for simultaneous (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) participation in such and/or in similar group (and/or not group) chat and/or group (and/or not group) audio-conference, and/or group (and/or not group) video-conference each participant and/or party (except of organizer) of such and/or of similar group (and/or not group) chat and/or group (and/or not group) audio-conference, and/or group (and/or not group) video-conference (i.e. linked up and/or connected contact/contacts from abovementioned (mentioned in part #013) contact lists) needs to have at least one/single account, which is registered in one of abovementioned (mentioned in part #013, in this example) link services (link service/services, which is/are used by this exact participant/party)—it is that account/accounts, which is/are connected to such and/or to similar group (and/or not group) chat and/or group (and/or not group) audio-conference, and/or group (and/or not group) video-conference.

In some embodiments, the methods, systems, and devices described herein only to the organizer of such and/or of similar group (and/or not group) chat and/or group (and/or not group) audio-conference, and/or group (and/or not group) video-conference it is necessary to use patent-pending service with such patent-pending functions.

For example, the contact/participant (and/or the contacts/participants) from the contact list of the account Skype1 needs/need to use at least this one link service Skype (to have installed program Skype and to have registered account in link service Skype, and this account presents connected contact/participant) to take part and/or to participate in such and/or similar group (and/or not group) chat and/or group (and/or not group) audio-conference, and/or group (and/or not group) video-conference.

The contact/participant (and/or the contacts/participants) from the contact list of the account Skype2 needs/need to use at least this one link service Skype (to have installed program Skype and to have registered account in link service Skype, and this account presents connected contact/participant) to take part and/or to participate in such and/or similar group (and/or not group) chat and/or group (and/or not group) audio-conference, and/or group (and/or not group) video-conference.

The contact/participant (and/or the contacts/participants) from the contact list of the account Viber1 needs/need to use at least this one link service Viber (to have installed program Viber and to have registered account in link service Viber, and this account presents connected contact/participant) to take part and/or to participate in such and/or similar group (and/or not group) chat and/or group (and/or not group) audio-conference, and/or group (and/or not group) video-conference.

The contact/participant (and/or the contacts/participants) from the contact list of the account Viber2 needs/need to use at least this one link service Viber (to have installed program Viber and to have registered account in link service Viber, and this account presents connected contact/participant) to take part and/or to participate in such and/or similar group (and/or not group) chat and/or group (and/or not group) audio-conference, and/or group (and/or not group) video-conference.

The contact/participant (and/or the contacts/participants) from the contact list of the account ICQ1 needs/need to use at least this one link service ICQ (to have installed program ICQ and to have registered account in link service ICQ, and this account presents connected contact/participant) to take part and/or to participate in such and/or similar group (and/or not group) chat and/or group (and/or not group) audio-conference, and/or group (and/or not group) video-conference.

The contact/participant (and/or the contacts/participants) from the contact list of the account ICQ2 needs/need to use at least this one link service ICQ (to have installed program ICQ and to have registered account in link service ICQ, and this account presents connected contact/participant) to take part and/or to participate in such and/or similar group (and/or not group) chat and/or group (and/or not group) audio-conference, and/or group (and/or not group) video-conference.

The contact/participant (and/or the contacts/participants) from the contact list of the account of any link service needs/need to use at least this one any link service (to have installed program of this one any link service and to have registered account in this one any link service, and this account presents connected contact/participant) to take part and/or to participate in such and/or similar group (and/or not group) chat and/or group (and/or not group) audio-conference, and/or group (and/or not group) video-conference.

In some embodiments, a first user, having registered account in patent-pending service and/or using patent-pending service, having connected to the present patent-pending service one account and/or more than one account, which are registered in one link service and/or in more than one link service, and/or in the number of link services, and/or in various link services, and/or in abovementioned various link services, have possibility to regulate separately my/his status in/for each of connected (to the patent-pending service) accounts (for example: "online", "offline", "not available" . . . etc.), and also have possibility to regulate separately any other functions in each separate account in such a way, as if I/he use/used to work with this account through standard service/program, and also have possibility to realize all and any functions, which are presented for the user of separate account, for all and/or for specified accounts simultaneously (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window); and/or there is a possibility of/for the organizer of group (and/or not group) chat and/or group (and/or not group) audio-conference, and/or group (and/or not group) video-conference to regulate—whether it is possible or not for the participants of the same and/or one, and/or single group (and/or not group) chat and/or group (and/or not group) audio-conference, and/or group (and/or not group) video-conference to see contact information of each other (everybody or someone separately), and/or to exchange with messages with each other (everybody or someone separately), and/or to hear each other (everybody or someone separately), to see video of each other (everybody or someone separately).

In some embodiments, the methods, systems, and devices described herein allow simultaneous (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) presence in several and/or specified accounts and/or in the number/range of accounts of the one/single link service of voice communication and/or of visual communication, and/or of message exchange (messages of any type).

In some embodiments, the methods, systems, and devices described herein facilitate simultaneous (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) presence in several and/or specified accounts and/or in the number/range of accounts of several and/or various, and/or multiple link services of voice communication and/or of visual communication, and/or of message exchange (messages of any type).

In some embodiments, the methods, systems, and devices described herein facilitate simultaneous (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) work in several and/or specified accounts and/or in the number/range of accounts of one/single link service of voice communication and/or of visual communication, and/or of message exchange (messages of any type.

In some embodiments, the methods, systems, and devices described herein facilitate simultaneous (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) work in several accounts and/or in the number/range of accounts of several and/or specified and/or various, and/or multiple link services of voice communication and/or of visual communication, and/or of message exchange (messages of any type.

In some embodiments, the methods, systems, and devices described herein facilitate simultaneous (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) fixation of status of the contacts in contact lists of several and/or specified accounts and/or of the number/range of accounts of one/single link service of voice communication and/or of visual communication, and/or of message exchange (messages of any type.

In some embodiments, the methods, systems, and devices described herein facilitate simultaneous (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) fixation of status of the contacts in contact lists of several and/or specified accounts and/or of the number/range of accounts of several and/or various, and/or multiple link services of voice communication and/or of visual communication, and/or of message exchange (messages of any type.

In some embodiments, the methods, systems, and devices described herein facilitate simultaneous (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) fulfillment of any and/or of various functions in several and/or specified accounts and/or in the number/range of accounts of one/single link service of voice communication and/or of visual communication, and/or of message exchange (messages of any type.

In some embodiments, the methods, systems, and devices described herein facilitate simultaneous (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) fulfillment of any and/or of various functions in several and/or specified accounts and/or in the number/range of accounts of several and/or various, and/or multiple link services of voice communication and/or of visual communication, and/or of message exchange (messages of any type).

For example, a first user, having registered account in patent-pending service and/or using patent-pending service, having connected to the present patent-pending service one account and/or more than one account, which are registered in link service Skype (in the present example there are two accounts, lets name them Skype1 and Skype2) and/or one account and/or more than one account, which are registered in link service Viber (in the present example there are two accounts, lets name them Viber1 and Viber2), and/or one account and/or more than one account, which are registered in link service ICQ (in the present example there are two accounts, lets name them ICQ1 and ICQ2), and/or one account and/or more than one account, which are registered in any other link service and/or in any other link services, is able to unite all (and/or specified) contacts from all (and/or specified) contact lists of all (and/or specified) accounts of several and/or one, and/or various, and/or multiple link services of voice communication and/or of visual communication, and/or of message exchange (messages of any type) into one/single list, and/or is able simultaneously (and/or at the same time, and/or in the mode of one/single and/or general, and/or mutual window, and/or in the mode of one/single and/or general, and/or mutual account, and/or in the mode of one/single and/or general, and/or mutual access, and/or as in one/single and/or general, and/or mutual account, and/or as in one/single and/or general, and/or mutual access, and/or as in one/single and/or general, and/or mutual window) to use this, and/or to work with this, and/or to organize group (and/or not group) chat and/or group (and/or not group) audio-conference, and/or group (and/or not group) video-conference, and/or to fulfill/realize any other actions, which are possible and/or which are getting sense using this and/or such type united and/or assembled contact list in such way, as if it was standard account with standard contact list of any link service (for example link service Skype, and/or link service Viber, and/or link service ICQ, and/or any other link service).

In some embodiments, a first user is able to unite all (and/or specified) contacts from the contact list of the account Skype1, and/or all (and/or specified) contacts from the contact list of the account Skype2, and/or all (and/or specified) contacts from the contact list of the account Viber1, and/or all (and/or specified) contacts from the contact list of the account Viber2, and/or all (and/or specified) contacts from the contact list of the account ICQ1, and/or all (and/or specified) contacts from the contact list of the account ICQ2, and/or all (and/or specified) contacts from the contact list(s) of the account(s) of any other link service(s) into one/single united contact list, and/or to have possibility to use this, and/or to work with this, and/or organize group (and/or not group) chat and/or group (and/or not group) audio-conference, and/or group (and/or not group) video-conference, and/or to fulfill/realize any other actions, which are possible and/or which are getting sense using this and/or such type united and/or assembled contact list in such way, as if it was standard (or not) account with standard (or not) contact list of any link service (for example link service Skype, and/or link service Viber, and/or link service ICQ, and/or any other link service).

In some embodiments, the methods, systems, and devices described herein provide possibility to use the mode of doubling of link services of voice communication and/or of visual communication, and/or of message exchange (messages of any type) in such way (,/;/.)

If, for example, the link service Skype, and/or link service Viber, and/or link service ICQ, and/or any other link service, and/or any other link services, account and/or accounts of which are were connected to the patent-pending service and/or to the account of the patent-pending service, stopped to function appropriately (i.e. there is no possibility to organize and/or to get connection, and/or there is no possibility to organize and/or to get connection of appropriate quality), then two clients (and/or more clients) of patent-pending service, who connected to and/or registered their account and/or accounts of link service Skype, and/or link service Viber, and/or link service ICQ, and/or any other link service, and/or any other link services in patent-pending service (and/or i.e. connected to their account and/or accounts in link service Skype, and/or link service Viber, and/or link service ICQ, and/or any other link service, and/or any other link services through patent-pending service (and/or using patent-pending service)), would be able to connect with each other, using patent-pending function of reserve and/or alternative line, and/or they would need to connect with each other just (and/or at least) using their accounts (and/or contact addresses) in link service Skype, and/or link service Viber, and/or link service ICQ, and/or any other link service, and/or any other link services, and/or i.e. if link service Skype had stopped (temporarily and/or in any other way) to function, then two (and/or more) subscribers/clients/users of link service Skype, who registered their Skype-accounts in patent-pending service (and/or connected their Skype-accounts to patent-pending service), would be able to connect with each other, using just (and/or at least) their Skype-accounts, and/or Skype-nicks, and/or Skype-names, and/or Skype-address in the form address to realize and/or to establish connection with each other using patent-pending service.

For example, if the link service Viber had stopped (temporarily and/or in any other way) to function, then two (and/or more) subscribers/clients/users of link service Viber, who registered their Viber-accounts in patent-pending service (and/or connected their Viber-accounts to patent-pending service), would be able to connect with each other, using just (and/or at least) their Viber-accounts, and/or Viber-nicks, and/or Viber-names, and/or Viber-address in the form address to realize and/or to establish connection with each other using patent-pending service.

For example, if link service ICQ had stopped (temporarily and/or in any other way) to function, then two (and/or more) subscribers/clients/users of link service ICQ, who registered their ICQ-accounts in patent-pending service (and/or connected their ICQ-accounts to patent-pending service), would be able to connect with each other, using just (and/or at least) their ICQ-accounts, and/or ICQ-nicks, and/or ICQ-names, and/or ICQ-address in the form address to realize and/or to establish connection with each other using patent-pending service (,/;/.)

For example, if any link service had stopped (temporarily and/or in any other way) to function, then two (and/or more) subscribers/clients/users of this any link service, who registered their accounts (of this any link service) in patent-pending service (and/or connected their accounts to patent-pending service), would be able to connect with each other, using just (and/or at least) their accounts, and/or nicks, and/or names, and/or address of this any link service in the form address to realize and/or to establish connection with each other using patent-pending service.

In other words, connection between two (and/or more) subscribers/clients/users of non-functioning link service (and/or non-functioning link services) would be possible even in that case, if these subscribers/clients/users had exchanged with contacts (i.e. had added accounts of each other to the contact list) just (and/or at least) in that link service (and/or link services), which stopped to function. If these subscribers/clients/users had exchanged with contacts (i.e. had added accounts of each other to the contact list) in frames of accounts of non-functioning link service (and/or link services), the exchange with contacts of accounts, registered in patent-pending service (and/or registration of accounts in patent-pending service) by these two (and/or more) subscribers/clients/users of non-functioning (temporarily and/or in any other way) link service (for example, of link service Skype, and/or link service Viber, and/or link service ICQ, and/or any other link service, and/or any other link services) is not obligatory/compulsory/mandatory or necessary condition to fulfill and/or to realize communication session between them.

I.e., there is no necessity to exchange with contact information of accounts, which are registered in patent-pending service, and/or there is NO necessity in registration of accounts in patent-pending service by subscribers/clients/users of non-functioning link service (and/or non-functioning link services), that is/are aimed to use patent-pending function (and/or patent-pending service) of reserve and/or alternative, and/or doubling link/connection line between two (and/or more) subscribers/clients/users of link service (and/or link services), which stopped to function.

Such kind of call (and/or connection) between two (and/or more) subscribers/clients/users of the patent-pending service can be reflected/presented/displayed by patent-pending service for these subscribers/clients/users of non-functioning link service (and/or non-functioning link services) in such way, as if non-functioning link service (and/or non-functioning link services) was/were working, and/or as it was the call (and/or connection) inside link service Skype, and/or inside link service Viber, and/or inside link service ICQ, and/or inside any other link service (and/or link services), and/or it can be pointed (or not), that reserve and/or alternative connection/link line is used, and/or also, it can be pointed/provided the contact information of client in patent-pending service (this can be regulated in accordance with desire of subscribers/clients/users of the patent-pending service).

In some embodiments, the methods, systems, and devices described herein facilitate repeated doubling of reserve and/or alternative connection line in frames of patent-pending service concerning and/or in the attitude to itself (i.e. concerning and/or in the attitude to patent-pending service). I.e. if (for example) patent-pending service (and/or patent-pending link service) stopped to function and/or stopped to function appropriately, then functions (and/or such functions) of patent-pending service in automatic mode (and/or by manually provided command of the user of patent-pending service (and/or patent-pending link service)) would be fulfilled/provided/realized by reserve and/or alternative (concerning and/or in the attitude to patent-pending service (and/or patent-pending link service) itself) connection line of the patent-pending service, and/or quantity of reserve and/or alternative connection lines can be any, and/or can be specified by developer and/or designer of patent-pending service (and/or patent-pending link service.

For example, a first user having a registered account in patent-pending service and/or user has/had carried out use of patent-pending service in such way, that in (and/or to) patent-pending service there is/was registered (and/or connected) account of the user in any link service, for example, in Skype and/or in any other link service, and the same is/was done in concern to link service Viber (and/or in concern to any other link service, which differs from the link service of the user) by subscriber and/or by addressee, and/or by contact, to whom the user wants to call, (and/or i.e. subscriber and/or addressee, and/or contact has/had registered in (and/or connected to) patent-pending service his account in link service Viber (and/or in any other link service, which is different from the link service of the user)), then both—user (link service Skype) and addressee (and/or subscriber, and/or contact) (link service Viber) could connect with each other, and/or user (link service Skype), when he is calling to addressee (and/or subscriber, and/or contact) (link service Viber), is able to use just (and/or at least) his account in Skype, having (and/or understanding) the fact, that he (i.e. user) is calling to the addressee (and/or subscriber, and/or contact) to the contact (and/or account), which is registered in Viber, and/or the registration (and/or receive) of accounts in patent-pending service by both, and/or by all, and/or by specified participants of such conference (and/or communication session) is not obligatory/compulsory/mandatory, it is necessary/obligatory just (and/or at least) to register Skype-account(s) (in this case to user) and/or Viber-account(s) (in this case to addressee) and/or account(s) of any other link service in the patent-pending service.

In some embodiments, it is possible (—patent-pending function and/or patent-pending service) to call form account in Skype to account in Viber, in case when both these accounts are registered in (and/or connected to) patent-pending service.

In some embodiments, it is possible (—patent-pending function and/or patent-pending service) to call form account in link-service1 to account in link-service2, in case when both these accounts are registered in (and/or connected to) patent-pending service.

In some embodiments, it is possible to organize group (and/or not group) chat and/or group (and/or not group) audio-conference, and/or group (and/or not group) video-conference from account in the Link-service1 (and/or registered in Link-service1), adding to it (i.e. into group (and/or not group) chat and/or group (and/or not group) audio-conference, and/or group (and/or not group) video-conference) account(s) in Link-servise2 (and/or registered in Link-servise2), and/or account(s) in Link-servise3 (and/or registered in Link-service3), and/or account(s) in Link-servise4 (and/or registered in Link-service4), and/or account(s) in Link-servise5 (and/or registered in Link-service5), and/or so on, when all these accounts are registered in (and/or connected to) patent-pending service.

In some embodiments, using patent-pending service, it is possible to connect with each other for two subscribers (and/or users) and/or for more than two subscribers (and/or users), when each of them is registered (and/or has account) in the link service, which is different from the rest of link services (engaged into the conference), and/or having such situation, in such/similar organized group (and/or not group) chat and/or group (and/or not group) audio-conference, and/or group (and/or not group) video-conference participant/subscriber/user can and/or will be reflected/represented/displayed in the form of nick, and/or account name, from which this exact participant entered into such/similar group (and/or not group) chat and/or group (and/or not group) audio-conference, and/or group (and/or not group) video-conference (,/;/.)

In some embodiments, realization of abovementioned actions—creation and/or registration of account(s) in patent-pending service is desirable, but it is not mandatory/obligatory, and/or in other words, all abovementioned actions can be realized, having for this at least one registered account in any link service, which (mentioned account) is registered in (and/or connected to) patent-pending service.

In some embodiments, when addressee of the call does not use patent-pending service, and patent-pending service is used only by the caller, and in this situation account of the caller and account of the addressee are placed (and/or registered) in different link services, then the call to the addressee will be realized from the service account of the patent-pending service, and such service account (of the patent-pending service) is registered in the link service of the addressee, and/or in the text message to the addressee it can be pointed (for example) contact (and/or account) of the caller, from which the call is realized, and/or any other necessary information from the point of view of the caller.

In some embodiments, there is also patent-pending function(s) and/or patent-pending service(s), which allow(s) to readdress audio-calls and/or video-calls, and/or messages of any type from account(s) in one link service and/or in different link services to the other account(s) in same and/or in the other link service(s).

In some aspects, the methods, systems, and devices described herein facilitate an alternative to roaming and/or alternative to international calls and/or to interregional calls).

In some embodiments, the methods, systems, and devices described herein facilitate connecting mobile phone/cellular telephone (and/or mobile phones/cellular telephones) with SIM-card of any telecoms operator (and/or SIM-cards of any telecoms operator(s)), and/or smartphone (and/or smartphones) with SIM-card of any telecoms operator (and/or SIM-cards of any telecoms operator(s)), and/or fixed location phone (and/or fixed location phones), which is/are connected to any phone number and/or communication line (and/or any phone numbers and/or communication lines), and/or SIM-card of any telecoms operator (and/or SIM-cards of any telecoms operator(s)) to and/or via, and/or through the patent-pending link service and/or patent-pending service in such way, that it will provide possibility to redirect/readdress all and/or selected, and/or specified, and/or defined by the user (and/or users) incoming audio-calls and/or video-calls, and/or SMS-messages, and/or MMS messages, and/or messages of any other type(s) to the account and/or to the accounts in any link service and/or link services (for example, to account and/or to accounts in link service Skype, and/or link service Viber, and/or in any other link service(s)), which is/are connected to the patent-pending service, and/or to the account in patent-pending link service, and thereby to answer on and/or to accept all and/or selected, and/or specified, and/or defined by the user (and/or users) incoming audio-calls and/or video-calls, and/or SMS-messages, and/or MMS messages, and/or messages of any other type(s), which are coming to the telephone number and/or to telephone numbers, which was/were connected to patent-pending service in abovementioned way.

In some embodiments, any user (and/or users) of patent-pending service will be able to accept and/or to be available for and/or accessible for all and/or selected, and/or specified, and/or defined by the user (and/or users) incoming audio-calls and/or video-calls, and/or SMS-messages, and/or MMS messages, and/or messages of any other type(s) (from telephone number(s), which was/were connected to patent-pending service), which are coming to mobile phone/cellular telephone (and/or mobile phones/cellular telephones) with SIM-card of any telecoms operator (and/or SIM-cards of any telecoms operator(s)), and/or smartphone (and/or smartphones) with SIM-card of any telecoms operator (and/or SIM-cards of any telecoms operator(s)), and/or fixed location phone (and/or fixed location phones), which is/are connected to any phone number and/or communication line (and/or any phone numbers and/or communication lines), and/or SIM-card of any telecoms operator (and/or SIM-cards of any telecoms operator(s)) via and/or through internet with the aid of account(s) in patent-pending link service and/or via and/or through internet with the aid of account and/or accounts in any link service and/or in any link services, which are connected to the patent-pending service and/or patent-pending link service, using for realization of abovementioned patent-pending service(s) and/or patent-pending device(s), and/or patent-pending program(s).

In some embodiment, the methods, systems, and devices described herein facilitate connecting mobile phone/cellular telephone (and/or mobile phones/cellular telephones) with SIM-card of any telecoms operator (and/or SIM-cards of any telecoms operator(s)), and/or smartphone (and/or smartphones) with SIM-card of any telecoms operator (and/or SIM-cards of any telecoms operator(s)), and/or fixed location phone (and/or fixed location phones), which is/are connected to any phone number and/or communication line (and/or any phone numbers and/or communication lines), and/or SIM-card of any telecoms operator (and/or SIM-cards of any telecoms operator(s)) to and/or via, and/or through the patent-pending link service and/or patent-pending service in such way, that it will provide possibility to realize and/or to carry out, and/or to send all and/or selected, and/or specified, and/or defined by the user (and/or users) outgoing audio-calls and/or video-calls, and/or SMS-messages, and/or MMS messages, and/or messages of any other type(s) through/via the account and/or through/via the accounts in any link service and/or link services (for example, through/via account and/or through/via accounts in link service Skype, and/or link service Viber, and/or in any other link service(s)), which is/are connected to the patent-pending service, and/or through/via the account in patent-pending link service, and thereby to realize and/or to carry out, and/or to send all and/or selected, and/or specified, and/or defined by the user (and/or users) outgoing audio-calls and/or video-calls, and/or SMS-messages, and/or MMS messages, and/or messages of any other type(s), from the telephone number and/or from telephone numbers, which was/were connected to patent-pending service in abovementioned way (,/;/.)

In some embodiments, any user (and/or users) of patent-pending service will be able to realize and/or to carry out, and/or to send all and/or selected, and/or specified, and/or defined by the user (and/or users) outgoing audio-calls and/or video-calls, and/or SMS-messages, and/or MMS messages, and/or messages of any other type(s) (from telephone number(s), which was/were connected to patent-pending service), which are coming from mobile phone/cellular telephone (and/or mobile phones/cellular telephones) with SIM-card of any telecoms operator (and/or SIM-cards of any telecoms operator(s)), and/or smartphone (and/or smartphones) with SIM-card of any telecoms operator (and/or SIM-cards of any telecoms operator(s)), and/or fixed location phone (and/or fixed location phones), which is/are connected to any phone number and/or communication line (and/or any phone numbers and/or communication lines), and/or SIM-card of any telecoms operator (and/or SIM-cards of any telecoms operator(s)) via and/or through internet with the aid of account(s) in patent-pending link service and/or via and/or through internet with the aid of account and/or accounts in any link service and/or in any link services, which are connected to the patent-pending service and/or patent-pending link service, using for realization of abovementioned patent-pending service(s) and/or patent-pending device(s), and/or patent-pending program(s) (,/;/.)

For example (example of combined use of patent-pending function(s) and/or patent-pending device(s), and/or patent-pending program(s), and/or patent-pending service(s), which are presented above in the section "Patent-pending functions, and/or patent-pending services, which provide alternative to roaming") any user (and/or users) of patent-pending service has/have telephone number and/or telephone (Lets name it telephone1) (and/or telephone numbers, and/or telephones), from which user needs to realize and/or to carry out, and/or to send all and/or selected, and/or specified, and/or defined by the user (and/or users) outgoing audio-calls and/or video-calls, and/or SMS-messages, and/or MMS messages, and/or messages of any other type(s) and/or to accept and/or to be available for and/or accessible for all and/or selected, and/or specified, and/or defined by the user (and/or users) incoming audio-calls and/or video-calls, and/or SMS-messages, and/or MMS messages, and/or messages of any other type(s), and by this reason the present user connects his telephone1 to the patent-pending service and/or patent-pending device, and/or patent-pending program in such way, that the present user is able to realize all necessary to him and/or abovementioned actions, from/using his abovementioned telephone1 via and/or with the aid of any link service and/or any link services, which are connected to the patent-pending service, and/or via and/or with the aid of account and/or accounts in any link service and/or in any link services, which are connected to the patent-pending service.

For example, when abroad the present user will be located in such zones and/or place, where mobile internet is absent and/or the quality of mobile internet is not appropriate, and/or by this reason the present user needs redirection and/or readdressing of all and/or selected, and/or specified, and/or defined by the user (and/or users) incoming and/or outgoing audio-calls and/or video-calls, and/or SMS-messages, and/or MMS messages, and/or messages of any other type(s), which are realized and/or preformed, and/or accepted by the present user, and/or by this reason, for fulfillment and/or realization of abovementioned aims, the present user can connect and/or connects local telephone number, which is residential in the attitude to the country, to which he arrived (Lets name it telephone2) to any link service and/or any link services, which is/are connected to the patent-pending service, and/or to account and/or accounts which is/are registered in any link service and/or in any link services, using (and/or with the aid of) patent-pending service and/or patent-pending device, and/or patent-pending program, and/or using second local telephone number, which is residential in the attitude to the country, to which he arrived (Lets name it telephone3), the present user is able to realize and/or to preform, and/or to accept all and/or selected, and/or specified, and/or defined by the user (and/or users) incoming and/or outgoing audio-calls and/or video-calls, and/or SMS-messages, and/or MMS messages, and/or messages of any other type(s) from telephone3 through and/or via telephone2, through and/or via any link service(s) by telephone1 using patent-pending service(s) and/or patent-pending function(s), and/or patent-pending device(s), and/or patent-pending program(s).

In some embodiments, the present user is able to realize and/or to preform, and/or to accept all and/or selected, and/or specified, and/or defined by the user (and/or users) incoming and/or outgoing audio-calls and/or video-calls, and/or SMS-messages, and/or MMS messages, and/or messages of any other type(s) via communication string "telephone1—any/our link service(s)—telephone2—telephone3" and/or via communication string "telephone3—telephone2—any/our link(s)—telephone1" thanks to use of patent-pending service and/or patent-pending device, and/or patent-pending program (,/;/.)

In some embodiments, similar communication strings, in case of necessity, can be reduced to "telephone1—any link service (and/or any link services)" and/or "any link service (and/or any link services)—telephone1"—in case, when user has access to stationary and/or to mobile internet, and he is able to realize and/or to preform, and/or to accept all and/or selected, and/or specified, and/or defined by the user (and/or users) incoming and/or outgoing audio-calls and/or video-calls, and/or SMS-messages, and/or MMS messages, and/or messages of any other type(s) using his account and/or accounts in any link service and/or link services (which is/are connected to patent-pending service), thanks to use of patent-pending service and/or patent-pending device, and/or patent-pending program, and/or to "any link service (and/or any link services)—telephone2—telephone3" and/or "telephone3—telephone2—any link service (and/or any link services)"—when user needs to realize and/or to preform, and/or to accept all and/or selected, and/or specified, and/or defined by the user (and/or users) incoming and/or outgoing audio-calls and/or video-calls, and/or SMS-messages, and/or MMS messages, and/or messages of any other type(s) using his account and/or accounts in any link service and/or link services (which is/are connected to patent-pending service), thanks to use of patent-pending service and/or patent-pending device, and/or patent-pending program, but only having access just to mobile communication via telephone3 (,/;/.)

In some embodiments, the methods, systems, and devices described herein facilitate, in state1 and/or in state2 (and/or in any other state(s), and/or in any other district(s)/region(s)) to connect mobile phone/cellular telephone (and/or mobile phones/cellular telephones) with SIM-card of any telecoms operator, residential in state1 and/or in state2 (and/or in any other state(s), and/or in any other district(s)/region(s)) (and/or SIM-cards of any telecoms operator(s), residential in state1 and/or in state2 (and/or in any other state(s), and/or in any other district(s)/region(s))), and/or smartphone (and/or smartphones) with SIM-card of any telecoms operator, residential in state1 and/or in state2 (and/or in any other state(s), and/or in any other district(s)/region(s)) (and/or SIM-cards of any telecoms operator(s), residential in state1 and/or in state2 (and/or in any other state(s), and/or in any other district(s)/region(s))), and/or fixed location phone (and/or fixed location phones), which is/are connected to any phone number and/or communication line, residential in state1 and/or in state2 (and/or in any other state(s), and/or in any other district(s)/region(s)) (and/or any phone numbers and/or communication lines, residential in state1 and/or in state2 (and/or in any other state(s), and/or in any other district(s)/region(s))), and/or SIM-card of any telecoms operator, residential in state1 and/or in state2 (and/or in any other state(s), and/or in any other district(s)/region(s)) (and/or SIM-cards of any telecoms operator(s), residential in state1 and/or in state2 (and/or in any other state(s), and/or in any other district(s)/region(s))) (hereinafter—connected telephone number(s) and/or telephone numbers) via, and/or through the patent-pending link service and/or patent-pending service, and/or account(s) in the patent-pending link service in such way, that it will provide possibility to any, and/or to specified user(s) (and/or i.e. account(s)) of the patent-pending link service, that who was/were allowed to use connected telephone number(s), to make any and/or different, and/or specified audio-calls and/or video-calls, and/or SMS-messages, and/or MMS messages, and/or messages of any other type(s) from connected telephone number(s).

For example, when somebody (hereinafter state1) has relatives abroad (hereinafter state2), and/or when any company (hereinafter state1) has foreign office (hereinafter state2), and/or in case of any other situation(s)—it is possible in state1 and/or in state2 (and/or in any other state(s), and/or in any other district(s)/region(s)) to connect mobile phone/cellular telephone (and/or mobile phones/cellular telephones) with SIM-card of any telecoms operator, residential in state1 and/or in state2 (and/or in any other state(s), and/or in any other district(s)/region(s)) (and/or SIM-cards of any telecoms operator(s), residential in state1 and/or in state2 (and/or in any other state(s), and/or in any other district(s)/region(s))), and/or smartphone (and/or smartphones) with SIM-card of any telecoms operator, residential in state1 and/or in state2 (and/or in any other state(s), and/or in any other district(s)/region(s)) (and/or SIM-cards of any telecoms operator(s), residential in state1 and/or in state2 (and/or in any other state(s), and/or in any other district(s)/region(s))), and/or fixed location phone (and/or fixed location phones), which is/are connected to any phone number and/or communication line, residential in state1 and/or in state2 (and/or in any other state(s), and/or in any other district(s)/region(s)) (and/or any phone numbers and/or communication lines, residential in state1 and/or in state2 (and/or in any other state(s), and/or in any other district(s)/region(s))), and/or SIM-card of any telecoms operator, residential in state1 and/or in state2 (and/or in any other state(s), and/or in any other district(s)/region(s)) (and/or SIM-cards of any telecoms operator(s), residential in state1 and/or in state2 (and/or in any other state(s), and/or in any other district(s)/region(s))) (hereinafter—connected telephone number(s)), via, and/or through the patent-pending link service and/or patent-pending service, and/or account(s) in the patent-pending link service in such way, that it will provide possibility being in state1 (and/or being in any other state(s), and/or via account(s) in patent-pending link service, which is/are allowed to use connected telephone number(s), which (i.e. connected telephone number(s)) is/are residential in state1 and/or in state2 (and/or in any other state(s), and/or in any other district(s)/region(s))) to make any and/or different, and/or specified audio-calls and/or video-calls, and/or SMS-messages, and/or MMS messages, and/or messages of any other type(s) from connected telephone number(s), residential in state2, to the telephone number(s), which is/are residential in state2 and/or not residential in state2, via, and/or through the patent-pending link service and/or patent-pending service.

In some embodiments, it will provide possibility being in state2 (and/or being in any other state(s), and/or via account(s) in patent-pending link service, which is/are allowed to use connected telephone number(s), which (i.e. connected telephone number(s)) is/are residential in state1 and/or in state2 (and/or in any other state(s), and/or in any other district(s)/region(s))) to make any and/or different, and/or specified audio-calls and/or video-calls, and/or SMS-messages, and/or MMS messages, and/or messages of any other type(s) from connected telephone number(s), residential in state1, to the telephone number(s), which is/are residential in state1 and/or not residential in state1, via, and/or through the patent-pending link service and/or patent-pending service.

In some embodiments, it will provide possibility being in any state (and/or being in any other state(s), and/or via account(s) in patent-pending link service, which is/are allowed to use connected telephone number(s), which (i.e. connected telephone number(s)) is/are residential in state1 and/or in state2 (and/or in any other state(s), and/or in any other district(s)/region(s))) to make any and/or different, and/or specified audio-calls and/or video-calls, and/or SMS-messages, and/or MMS messages, and/or messages of any other type(s) from connected telephone number(s), residential in different state, to the telephone number(s), which is/are residential different state and/or not residential in different state, via, and/or through the patent-pending link service and/or patent-pending service.

In some embodiments, an account(s) in patent-pending link service, which is/are allowed to use connected telephone number(s), which is/are residential in state1 and/or in state2 (and/or in any other state(s), and/or in any other district(s)/region(s)) to make group (and/or not group) chat and/or group (and/or not group) audio-conference, and/or group (and/or not group) video-conference to which it is possible to connect user(s) of telephone number(s), which is/are (i.e. telephone number(s)) residential in state1 and/or in state2, and/or in any other state(s), calling to this/these telephone number(s) from connected telephone number(s), which is/are residential in state1 and/or in state2 (and/or in any other state(s), and/or in any other district(s)/region(s)) via, and/or through the patent-pending link service and/or patent-pending service.

For example, in Ukraine there are three main telecoms operators (more than 95% of the mobile market (without fixed location phones telecoms operator))—they are KievStar, MTC and Life, and lets suggest, that these three telecoms operators—are the only three telecoms operators in Ukraine. In this case I (and/or anybody), being in Ukraine, using patent-pending service(s) and/or patent-pending function(s), and/or patent-pending device(s), and/or patent-pending program(s), and/or patent-pending link service, can connect to my/his account in or patent-pending link service one or two, or more telephone numbers of KievStar telecoms operator, and/or one or two, or more telephone numbers of MTC telecoms operator, and/or one or two, or more telephone numbers of Life telecoms operator (hereinafter—connected telephone number(s) and/or telephone number (s)). The same is done by my partner(s), who is/are (for example) in Germany and/or in any other state(s) concerning to telephone number(s) of telecoms operator(s) of Germany, and/or of any other state(s). I allow (provide access) to use all and/or specified connected telephone number(s) of telecoms operators of Ukraine, connected by me, (telephone number(s) of telecoms operators of Ukraine, which were connected by me to my account in patent-pending link service) to my partner(s). The same is done by my partner(s) in the attitude to me. And it is possible for me and/or to partner(s) to make settings, which allow to make the next: all (and/or specified) audio-calls and/or video-calls, and/or SMS-messages, and/or MMS messages, and/or messages of any other type(s), the addressee(s) of which is/are user(s) of telephone number(s) of KievStar telecoms operator—will be made from connected telephone number(s) of KievStar telecoms operator, and/or the addressee(s) of which is/are user(s) of telephone number(s) of MTC telecoms operator—will be made from connected telephone number(s) of MTC telecoms operator, and/or the addressee(s) of which is/are user(s) of telephone number(s) of Life telecoms operator—will be made from connected telephone number(s) of Life telecoms operator. The same settings can be done in the attitude to the telephone number(s) of telecoms operator(s) of Germany and/or of any other state(s). Any other settings from which telephone number(s) to which telephone numbers to make all (and/or specified) audio-calls and/or video-calls, and/or SMS-messages, and/or MMS messages, and/or messages of any other type(s)—are also possible. It is known, there are tariff packages/tariffs, which allow making free of charge and/or very inexpensive audio-calls and/or video-calls, and/or SMS-messages, and/or MMS messages, and/or messages of any other type(s) inside the network of telecoms operator. In case, when I and my partner(s) have chosen such tariff packages/tariffs for all (and/or for specified) connected telephone number(s)—it means, that for me and for my partner(s) (using our accounts in patent-pending link service and/or using link service, and/or being in this moment in any part of the world, where is possible to have appropriate quality connection to internet) it is possible to make residential/local (and/or not residential, when it is necessary) audio-calls and/or video-calls, and/or SMS-messages, and/or MMS messages, and/or messages of any other type(s) (hereinafter—calls) from the connected telephone number(s) to all and/or to any, and/or to specified cell telephone numbers of telecoms operators of Ukraine (and/or to all and/or to any, and/or to specified cell telephone numbers of telecoms operators of Germany, and/or to all and/or to any, and/or to specified cell telephone numbers of telecoms operators of any other state(s), where my partner(s) has/have connected residential/local telephone number(s) of residential/local telecoms operator(s))—paying for made calls in accordance with tariffs for local calls and/or i.e. for calls between single-state telephone numbers, and/or for calls between telephone numbers of one and/or of the same operator.

For example, when a contact from any other state(s) need(s) to accept incoming calls and/or to realize outgoing calls from specified Ukrainian telephone number(s)—I can provide my partner(s) with exact Ukrainian telephone number(s), connecting this/these Ukrainian telephone number(s) to my account(s) in patent-pending link service, specifying this/these Ukrainian telephone number(s) just for my above-mentioned partner(s). The same can be done by my partners in the attitude to me.

Exemplary Embodiments

In one aspect, a method (as well as corresponding electronic devices that perform the method and storage medium including instructions for performing the method) is provided where, at a first electronic device associated with a first user, the first electronic device having one or more processors, a communications module, and a memory, the memory storing a first communication application having a first identity and a first build (e.g., a particular version of the application). A first request is transmitted from the first communication application to open a communication channel, through a first server associated with the first communication application, with a conference server.

The method further including, at the conference server, the conference server having one or more processors, a communications module, and a memory, the memory storing a conversion program for facilitating communication between the first communication application and a second communication application, wherein the second communication application has a second identity that is different from the first identity of the first communication application, after receiving the first request transmitted by the first electronic device, establishing a first communication channel with the first electronic device operating the first communication application, through the first server associated with the first communication application, establishing a second communication channel with a second electronic device operating the second communication application, through a second server associated with the second communication application, and after establishing the first communication channel with the first electronic device and the second communication channel with the second electronic device, facilitating communication between the first communication channel and the second communication channel (e.g., converting communication signals sent through the first communication application into communication signals compatible with the second communication application and vice versa).

In some embodiments, the method also includes, at the conference server, establishing a communication channel with a third electronic device operating a third communication application, through a third server associated with the third application, wherein the third communication application has a third identity that is different from the first identity of the first communication application and the second identity of the second communication application, and facilitating contemporaneous communication between the first communication channel, the second communication channel, and the third communication channel.

In some embodiments, the method also includes, at the conference server, establishing a communication channel with a fourth electronic device, through a telephone signal (e.g., wired or wireless), and facilitating contemporaneous communication between the first communication channel, the second communication channel, and the telephone signal.

In some embodiments, one or more of the first communication channel and the second communication channel is routed, through the corresponding first server associated with the first communication application or second server associated with the second communication application, to a plurality of electronic devices, including the corresponding first electronic device or second electronic device (e.g., the first or second electronic device was part of a conference facilitated by the first communication application and a communication channel was established between the conference and the conference server).

In some embodiments, the first communication channel and the second communication channel are associated with a same conference identification code (e.g., the first electronic device and the second electronic device both transmit the conference identification code to the conference server, which facilitates identification of the first and second communication channels as belonging to a single conference).

In some embodiments, the first electronic device transmits an identification of the second electronic device, the identification of the second electronic device associated with an identity of the second communication application (e.g., which is sent to the communication server by the first device and/or pre-stored in a memory associated with the conference server (e.g., such that the conference server matches an identification of the second device, sent by the first electronic device, to an account that includes the identity of the second communication application), and the second communication channel is established by the conference server transmitting a request (e.g., prior to or after establishing the first communication channel) to open the second communication channel, through the second server associated with the second communication application, to the second electronic device, and the second electronic device accepting the request to open the second communication channel.

In one aspect, a method (as well as corresponding electronic devices that perform the method and storage medium including instructions for performing the method) is provided including, at a first electronic device associated with a first user, the first electronic device having one or more processors, a communications module, and a memory, wherein the first electronic device is located in a first region (e.g., country) in a plurality of regions, transmitting, to a first server (e.g., a PBX box) in a plurality of servers, a first request to open a communication channel with a second electronic device, wherein the first server is located within the first region.

The method further including, at the first server, identifying a second region in the plurality of regions where the second electronic device is located, identifying a second server in the plurality of servers located in the second region, and routing the first request from the first electronic device to the second, through the second server, to the second electronic device.

In one aspect, a method (as well as corresponding electronic devices that perform the method and storage medium including instructions for performing the method) is provided including, at a first electronic device associated with a first user, the first electronic device having one or more processors, a communications module, and a memory, the memory storing a first communication application having a first identity and a first build, receiving a request to open a communication channel, through a first server associated with the first communication application, with a second electronic device having one or more processors, a communications module, and a memory, the memory storing a second communication application having a second identity (e.g., where the first communication application and the second communication application are the same or different), responsive to detecting an insufficient Internet connection for establishing a communication channel with the second electronic device, placing a telephone call to a third electronic device, wherein the third electronic device has a sufficient Internet connection to establish a communication channel with the second electronic device.

The method further including at the third electronic device, the third electronic device having one or more processors, a communications module, and a memory, the memory storing a third communication application having a third identity (e.g., where the third communication application is the same or different than either of the first and second communication applications), transmitting a second request from the second communication application to open a communication channel, through a second server associated with the second communication application, with the second device, and after establishing the communication channel with the second communication device, facilitating communication between the first electronic device, through a phone connection, and the second electronic device, through the second server associated with the first communication application.

In some embodiments, the second communication application stored in the memory of the second electronic device has a same identity as the third communication application stored on the third device, and the third electronic device transmits the second request, through the second server associated with the second communication application, directly to the second electronic device.

In some embodiments, the second communication application stored in the memory of the second electronic device has a different identity as the third communication application stored on the third device, the third electronic device transmits the second request, through the third server associated with the third communication application, to a conference server having one or more processors, a communications module, and a memory, the memory storing a conversion program for facilitating communication between the second communication application and the third communication application, and the conference server establishes a communication channel with a second electronic device operating the second communication application, through the second server associated with the second communication application, and after establishing the second communication channel with the second electronic device, facilitating communication between the second electronic device, through the second server associated with the second communication application, and the third electronic device, through the third server associated with the third communication application (e.g., by converting communication signals sent through the second communication application into communication signals compatible with the third communication application and vice versa).

In some embodiments, the third electronic device is located in a first region in a plurality of regions, the second electronic device is located in a second region in the plurality of regions, the third electronic device transmits the second request, through the third server associated with the third communication application, to a first conference server in a plurality of conference servers, the first conference server located within the first region and having one or more processors, a communications module, and a memory, the memory storing a conversion program for facilitating communication between the second communication application and the third communication application, and the first conference server identifies a second region in the plurality of regions where the second electronic device is located, identifies a second server in the plurality of servers located in the second region, and establishes a communication channel, through the second server in the plurality of servers, with a second electronic device operating the second communication application, through the second server associated with the second communication application, and after the second communication channel with the second electronic device is established, one of the first conference server and the second conference server facilitates communication between the second electronic device, through the second server associated with the second communication application, and the third electronic device, through the third server associated with the third communication application (e.g., by converting communication signals sent through the second communication application into communication signals compatible with the third communication application and vice versa).

CONCLUDING REMARKS

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

Memory optionally includes high-speed random access memory and optionally also includes non-volatile memory, such as one or more magnetic disk storage devices, flash memory devices, or other non-volatile solid-state memory devices. Access to memory by other components of device, such as one or more processors and a peripherals interface, is, optionally, controlled by a memory controller.

A peripherals interface can be used to couple input and output peripherals of the device to one or more processors and memory. The one or more processors run or execute various software programs and/or sets of instructions stored in memory to perform various functions for device and to process data.

Each of the above identified modules and applications correspond to a set of executable instructions for performing one or more functions described above and the methods described in this application (e.g., computer-implemented methods). These modules (i.e., sets of instructions) need not be implemented as separate software programs, procedures or modules, and thus various subsets of these modules are, optionally, combined or otherwise re-arranged in various embodiments. In some embodiments, memory optionally stores a subset of the modules and data structures identified above. Furthermore, memory optionally stores additional modules and data structures not described above.

Accordingly, in other embodiments, the present disclosure provides electronic devices including one or more processors, memory, and at least two displays, where the memory includes instructions for performing all or a portion of one or more methods described herein. For example, in some embodiments, server devices are provided that perform only the server-specific steps of the methods described herein. Likewise, in some embodiments, electronic devices (e.g., smartphones) are provided that perform only the client-specific steps of the methods described herein.

In other embodiments, the present disclosure provides computer readable storage medium (e.g., non-transitory medium) storing one or more programs, the one or more programs including instructions, which when executed by an electronic device with one or more processors and at least two displays, cause the device to perform all or a portion of one or more methods described herein. For example, in some embodiments, storage mediums for server devices are provided that include instructions for only the server-specific steps of the methods described herein. Likewise, in some embodiments, storage mediums for electronic devices (e.g., smartphones) are provided that include instructions for only the client-specific steps of the methods described herein.

In other embodiments, the present disclosure provides methods that, when performed at an electronic device including one or more processors, memory, and at least two displays, performs all or a portion of the functions described herein. For example, in some embodiments, methods are provided that only includes the server-specific steps of the methods described herein. Likewise, in some embodiments, methods are provided that only include the client-specific steps of the methods described herein.

It will also be understood that, although the terms "first," "second," etc. may be used herein to describe various elements, these elements should not be limited by these terms. These terms are only used to distinguish one element from another. For example, a first object could be termed a second object, and, similarly, a second object could be termed a first object, without changing the meaning of the description, so long as all occurrences of the "first object" are renamed consistently and all occurrences of the "second object" are renamed consistently. The first object and the second object are both objects, but they are not the same object.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
   receiving, by a computer based system from a first electronic device via a first electronic device associated with a first user, a request to open a first internet protocol communication channel, through a first server associated with the first communication application, with a second electronic device having one or more processors, and a memory, the memory storing a second communication application having a second identity,
   responsive to detecting an insufficient Internet connection for establishing the first internet protocol communication channel with the second electronic device, placing, by a computer based system, a telephone call to a third electronic device, wherein the third electronic device has a sufficient Internet connection to establish the first internet protocol communication channel with the second electronic device;
   receiving, by the computer based system, a second request from the third communication application to open the first internet protocol communication channel, through a third server associated with the third communication application, with the second device, and
   after establishing the first internet protocol communication channel with the second communication device, facilitating communication between the first electronic device, through a phone connection, and the second electronic device, through the first internet protocol communication channel.

2. The method of claim 1, wherein:
   the second communication application stored in the memory of the second electronic device has a same identity as the third communication application stored in the memory of the third electronic device, and
   the third electronic device transmits the second request to open the first internet protocol communication channel, through the third server associated with the third communication application, directly to the second electronic device.

3. The method of claim 1, wherein:
   the second communication application stored in the memory of the second electronic device has a different identity then the third communication application stored in the memory of the third electronic device,
   the third electronic device transmits the second request to open the first internet protocol communication channel, through the third server associated with the third communication application, to a conference server having one or more processors and a memory, the memory storing a conversion program for facilitating communication between the second communication application and the third communication application, and
   the conference server:
      after establishing the first internet protocol communications channel with the third electronic device, establishes a second internet protocol communication channel with the second electronic device operating the second communication application, through a second server associated with the second communication application, and after establishing the second communication channel with the second electronic device, facilitating communication between the first internet protocol communication channel and the second internet protocol communication channel.

4. The method of claim 1, wherein:

the third electronic device is located in a first region in a plurality of regions;

the second electronic device is located in a second region in the plurality of regions;

the third electronic device transmits the second request, through the third server associated with the third communication application, to a first conference server in a plurality of conference servers, the first conference server located within the first region and having one or more processors and a memory, the memory storing a conversion program for facilitating communication between the second communication application and the third communication application, the first conference server:
  identifies a second region in the plurality of regions where the second electronic device is located,
  identifies a second server in the plurality of servers located in the second region, and
  establishes an internet protocol communication channel, through the second server in the plurality of servers, with a second electronic device operating the second communication application, through the second server associated with the second communication application; and after the second communication channel with the second electronic device is established, one of the first conference server and the second conference server facilitates communication between the second electronic device, through the second server associated with the second communication application, and the third electronic device, through the third server associated with the third communication application.

5. A non-transitory computer-readable storage medium having stored thereon sequences of instructions, the sequences of instructions including instructions which, when executed by a computer based system, cause the computer based system to perform operations comprising:

receiving, by the computer based system from a first electronic device via a first electronic device associated with a first user, a request to open a first internet protocol communication channel, through a first server associated with the first communication application, with a second electronic device having one or more processors, and a memory, the memory storing a second communication application having a second identity, responsive to detecting an insufficient Internet connection for establishing the first internet protocol communication channel with the second electronic device, placing, by a computer based system, a telephone call to a third electronic device, wherein the third electronic device has a sufficient Internet connection to establish the first internet protocol communication channel with the second electronic device;

receiving, by the computer based system, a second request from the third communication application to open the first internet protocol communication channel, through a third server associated with the third communication application, with the second device, and after establishing the first internet protocol communication channel with the second communication device, facilitating communication between the first electronic device, through a phone connection, and the second electronic device, through the first internet protocol communication channel.

6. A computer based system comprising:

processor;

a tangible network interface communicating with a tangible, non-transitory memory;

the tangible, non-transitory memory communicating with the processor; and the processor, when executing a computer program, perform operations comprising:

receiving, by the computer based system from a first electronic device via a first electronic device associated with a first user, a request to open a first internet protocol communication channel, through a first server associated with the first communication application, with a second electronic device having one or more processors, and a memory, the memory storing a second communication application having a second identity, responsive to detecting an insufficient Internet connection for establishing the first internet protocol communication channel with the second electronic device, placing, by a computer based system, a telephone call to a third electronic device, wherein the third electronic device has a sufficient Internet connection to establish the first internet protocol communication channel with the second electronic device;

receiving, by the computer based system, a second request from the third communication application to open the first internet protocol communication channel, through a third server associated with the third communication application, with the second device, and after establishing the first internet protocol communication channel with the second communication device, facilitating communication between the first electronic device, through a phone connection, and the second electronic device, through the first internet protocol communication channel.

* * * * *